Feb. 26, 1957   C. S. LEONARDSON ET AL   2,782,468
GROOVED PLYWOOD PANEL
Filed Sept. 1, 1954
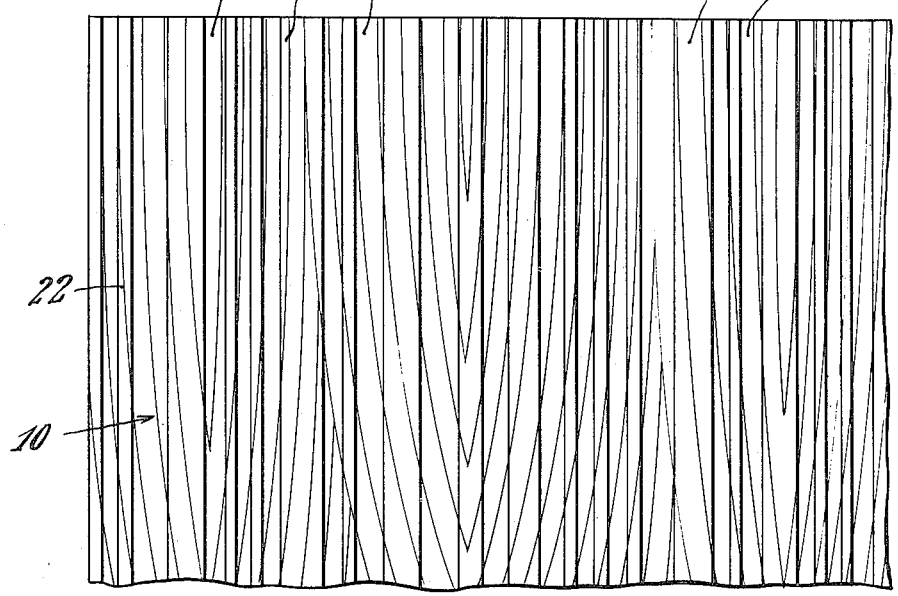
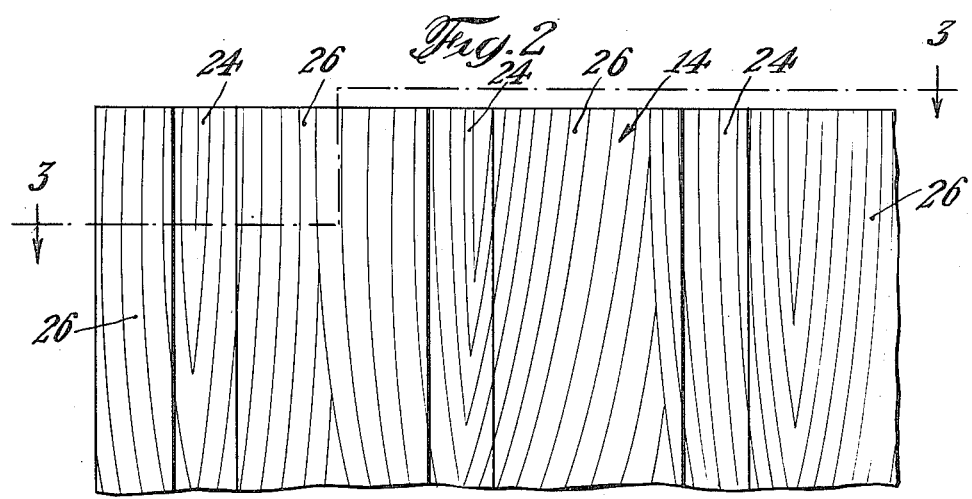
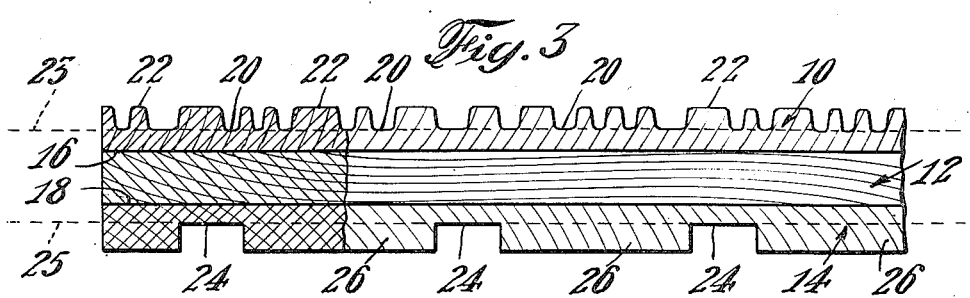

United States Patent Office 2,782,468
Patented Feb. 26, 1957

2,782,468
GROOVED PLYWOOD PANEL

Carl S. Leonardson, Jack Gifford Gates, and Cornelius Reckers, Olympia, Wash., assignors to Georgia-Pacific Plywood Company, Olympia, Wash., a corporation of Georgia Application September 1, 1954, Serial No. 453,464

7 Claims. (Cl. 20—89)

The present invention relates to plywood panels and more particularly to the construction of a plywood panel having a grooved face ply and in which the tendency to warp under changing moisture conditions is reduced to a minimum.

A popular type of plywood is made up of three plies of Douglas fir in which the face and back plies are of equal thickness with their grain substantially parallel and the central or core ply has its grain transverse to the grain of the face and back plies. Other types of plywood may comprise a larger number of plies or may be made of various or mixed species of woods. However, in general, where the face and back plies are of the same species and are of equal thickness the resulting laminated structure is referred to as "balanced" and may be expected to be reasonably stable against warping in either direction under changing moisture conditions. As is well known, wood is quite stable dimensionally in a direction parallel with the grain under changing moisture conditions but is subject to substantial expansion and contraction in a direction transverse the grain. In the balanced three ply construction described above the forces incident to the transverse expansion and contraction of the face and back plies are equal and are equally resisted by the central ply and the forces exerted by the central ply are equally resisted by the face and back plies.

For various reasons it may be desired to provide a texture in the face ply which differs from the usual flat smooth finish. When such texture is achieved by cutting grooves in a face ply which has the same thickness as the back ply the resulting structure will become unbalanced. It has been proposed to provide a thinner back ply more or less calculated to balance the grooved face ply but such procedure requires the production of veneers of different thickness and the assembly of one kind of plywood boards for grooved production and another kind for normal production.

It is an object of the present invention to provide a balanced grooved plywood which may be economically manufactured from a standard plywood having face and back plies of equal thickness and in which the grooving in the face ply may be narrow and closely spaced, irregular as to width and spacing if so desired, while the back ply differs but little in all practical respects from the normal smooth-surfaced back ply of standard plywood.

The object of the present invention is achieved by cutting or gouging relatively narrow, closely spaced grooves of uniform depth in the face ply with or without such irregularity as may be desired in width and spacing to achieve a random appearance, and the cutting or gouging in the back ply of a simple pattern of relatively wide and relatively widely spaced grooves with care being taken that the same quantity of wood is removed in the grooving of both the face and back plies. Thus, while the face ply pattern may comprise grooves of random width and spacing ranging from 1/16" to 3/16" or more the back ply pattern may comprise grooves 3/8" wide spaced more or less uniformly at intervals of approximately 1/2". The width, depth and spacing of the back-ply grooves are so calculated as to result in the removal of the same quantity of wood from the back ply as is removed from the front ply in the particular pattern selected. Particular combinations of widths, depths or spacings of the grooves in the back ply which will result in the removal of the necessary volume of wood are not critical since each of these factors may be varied within reason with proportionate variation in the remaining factors as will be discussed hereinbelow.

The plywood provided by the present invention has equal volumes of wood in the face and back plies and provided it has a reasonable number and spacing of grooves in the back ply the finished structure will be sufficiently well balanced against warping to meet practical requirements.

In the drawings wherein there is illustrated a preferred, but not necessarily the only, form of the present invention:

Fig. 1 is a front elevation of a fragment of a sheet of plywood embodying the present invention;

Fig. 2 is a rear elevation of the same; and

Fig. 3 is an end view of the same with a part in section along the line 3—3 in Fig. 2.

Referring now to the drawings the plywood of the present invention is shown as comprising a face ply indicated generally at 10, a central or core ply indicated generally at 12 and a back ply indicated generally at 14. The central or core ply 12 is shown as a single ply similar to the plies 10 and 14 but it will be understood that the principles of the present invention are applicable to plywood constructions wherein a plurality of inner plies is provided or wherein "lumber" or other types of core may be used. The plies 10, 12, and 14 are secured together in facewise contact along "glue lines" 16 and 18 by any suitable adhesive.

The face ply 10 and back ply 14 are of the same thickness and usually will be of the same species of wood. The grain of the face ply 10 is parallel with the grain of the back ply 14 and the end grain is illustrated in Fig. 3. The grain of the central ply 12 runs transversely of the grain of the face and back plies as is usual in plywood construction.

The face ply 10 has formed therein a plurality of grooves 20 which are parallel with each other and generally parallel with the grain of the ply 10 separated by ridges 22 the upper surfaces of which lie in the plane of the original surface of the ply 10. The grooves 20 are all of the same depth and of uniform depth throughout the lengths thereof. The grooves 20 may be of uniform width and spacing if so desired but usually will be of random width and spacing as illustrated in the drawings. The depth of the grooves 20 may be as great as desired although they normally will not extend into the glue line 16 and normally will have a depth of at least half the thickness of the ply 10. As indicated by the dot and dash line 23 the grooves 20 are all of the same depth and the bottoms thereof define a plane parallel with the glue line 16. The grooves 20 may have sharp or rounded edges or, as illustrated, may have edges of varying shape to impart visual interest to the pattern. The grooves 20 may be formed by any suitable cutter such as a gang-saw after the plywood is assembled.

Ordinarily the pattern of the grooves 20, although random, will repeat in every several inches of width of the ply 10. The sum of the areas of a cross-sectional representation of the grooves, such as in Fig. 3, constitutes a function of the volume of wood removed in the grooving operation. Thus for each repeat of the pattern or for the entire width of a panel if the pattern does not repeat, the areas may be added for use in calculating the volume of wood removed.

The back ply 14 has formed therein a plurality of parallel grooves 24 having equal depths and being uniform in depth throughout their lengths. The bottoms of grooves 24 define a plane 25 parallel with the glue line 18. The grooves 24 may have any desired depth and need not have the same depths as the grooves 20 in the face ply 10. As in the case of the grooves 20 the grooves 24 ordinarily will not intersect the glue line 18 and ordinarily will have a depth of at least one-half the thickness of the back ply 14. The grooves 24 are of such width and are so spaced with regard to the depth thereof as to result in the removal of the same volume of wood from the back ply 14 as is removed from the face ply 10. Thus the areas of the cross-sectional representation of the grooves 24 for any substantial width of the plywood, such as the interval of pattern repeat on the face ply 10, will be equal to the cross sectional areas of the grooves 20 for the same width.

No attempt has been made herein to present an accurate scale drawing of a face ply and back ply pattern which provides for removal of exactly the same volume of wood from each ply. It will be understood that such patterns require very careful calculation and that an almost infinite variation in detailed dimensions may be employed. In a general sense it may be stated that patterns for the front ply may repeat as often as every six inches without becoming monotonous in appearance and in the back ply the grooves 24 should not be much more than three or four inches apart. As a practical matter the grooves 24 may be approximately 3/8" wide and about 1/2" apart and the depth thereof may be varied to exactly balance the face-ply pattern when the face-ply pattern constitutes grooves and ridges varying in width from about 1/16" to about 3/16" and having a depth of approximately three-fourths of the thickness of the face ply.

A particular advantage of the present invention lies in the fact that the grooves 24 may be formed by a cutter, such as a gang-saw, which is much less expensive to acquire and to maintain than the cutter required to produce the face-ply pattern. Furthermore the ridges 26 extending between the grooves 24 are quite wide and flat and for all practical purposes present a smooth surface which offers no installation problems in use.

Plywood panels constructed in accordance with the present invention are satisfactorily proofed against warping along a line parallel with the direction of the grain of the face ply because the forces developed upon expansion or contraction of the inner ply or core result in the application of tension or compression lengthwise of the grain of the face and back plies and since the volumes of wood in the face and back plies are equal they will exert equal resistance to such forces. Similarly expansion and contraction of the face and back plies in directions across their grain will produce substantially equal forces since the volumes of wood are the same. Such equal forces are resisted by the inner ply or core which is placed under tension or compression thereby without any tendency toward warping.

We claim:

1. A plywood panel having outer face and back plies of substantially identical thickness and at least one inner ply, said plies being secured in face to face contact by adhesive with the grain of the face ply parallel with the grain of the back ply and with the grain of at least one inner ply extending transversely of the grain of said face and back plies, said face ply having a plurality of parallel relatively narrow closely spaced grooves formed therein by removal of a predetermined volume of wood, and said back ply having a plurality of relatively wide widely spaced parallel grooves formed therein by removal of a volume of wood substantially identical with said predetermined volume removed from said face ply, said grooves in said back ply being separated by portions of said back ply which are unreduced in thickness and which present flat surfaces in a common plane having a total area at least about one-half that of said back ply.

2. A plywood panel having outer face and back plies of substantially identical thickness and at least one inner ply, said plies being secured in face to face contact by adhesive with the grain of the face ply parallel with the grain of the back ply and with the grain of at least one inner ply extending transversely of the grain of said face and back plies, said face ply having a plurality of parallel relatively narrow closely spaced grooves formed therein by removal of a predetermined volume of wood, said grooves being of equal depth and of uniform depth throughout the lengths thereof, and said back ply having a plurality of relatively wide widely spaced parallel grooves formed therein by removal of a volume of wood substantially identical with said predetermined volume removed from said face ply, said grooves in said back ply being separated by portions of said back ply which are unreduced in thickness and which present flat surfaces in a common plane having a total area at least about one-half that of said back ply.

3. A plywood panel having outer face and back plies of substantially identical thickness and at least one inner ply, said plies being secured in face to face contact by adhesive with the grain of the face ply parallel with the grain of the back ply and with the grain of at least one inner ply extending transversely of the grain of said face and back plies, said face ply having a plurality of relatively narrow closely spaced grooves parallel with each other and with the grain of said face ply formed therein by removal of a predetermined volume of wood, and said back ply having a plurality of relatively wide widely spaced grooves parallel with each other and with the grain of said back ply formed therein by removal of a volume of wood substantially identical with said predetermined volume removed from said face ply, said grooves in said back ply being separated by portions of said back ply which are unreduced in thickness and which present flat surfaces in a common plane having a total area at least about one-half that of said back ply.

4. A plywood panel having outer face and back plies of substantially identical thickness and at least one inner ply, said plies being secured in face to face contact by adhesive with the grain of the face ply parallel with the grain of the back ply and with the grain of at least one inner ply extending transversely of the grain of said face and back plies, said face ply having a plurality of relatively narrow closely spaced grooves parallel with each other and parallel with the grain of said face ply formed therein by removal of a predetermined volume of wood said grooves being of equal depth and of uniform depth throughout the lengths thereof, and said back ply having a plurality of relatively wide widely spaced grooves parallel with each other and with the grain of said back ply formed therein by removal of a volume of wood substantially identical with said predetermined volume removed from said face ply said last-named grooves being of equal depth and of uniform depth throughout the length thereof, said grooves in said back ply being separated by portions of said back ply which are unreduced in thickness and which present flat surfaces in a common plane having a total area at least about one-half that of said back ply.

5. A plywood panel having outer face and back plies of substantially identical thickness and at least one inner ply, said plies being secured in face to face contact by adhesive with the grain of the face ply parallel with the grain of the back ply and with the grain of at least one inner ply extending transversely of the grain of said face and back plies, said face ply having a plurality of grooves parallel with each other and with the grain of said face ply formed therein by removal of a predetermined volume of wood, said grooves having widths lying within the range of from about one-sixteenth inch to about three-sixteenths inch and being spaced within the same range, and said back ply having a plurality of grooves parallel with the grooves in said face ply and spaced from each other at substantially uniform intervals lying within a range of from about one-half inch to about four inches, said last named grooves being formed in said back ply by removal of a volume of wood substantially identical with said predetermined volume removed from said face ply, said grooves in said back ply being separated by portions of said back ply which are unreduced in thickness and which present flat surfaces in a common plane having a total area at least about one-half that of said back ply.

6. A plywood panel having outer face and back plies of substantially identical thickness and at least one inner ply, said plies being secured in face to face contact by adhesive with the grain of the face ply parallel with the grain of the back ply and with the grain of at least one inner ply extending transversely of the grain of said face and back plies, said face ply having a plurality of grooves parallel with each other and with the grain of said face ply formed therein by removal of a predetermined volume of wood, said grooves having widths varying at random from about one-sixteenth inch to about three-sixteenths inch and being spaced at random within the same range, and said back ply having a plurality of grooves parallel with the grooves in said face ply and spaced from each other at substantially uniform intervals lying within a range of from about one-half inch to about four inches, said last named grooves being formed in said back ply by removal of a volume of wood substantially identical with said predetermined volume removed from said face ply, said grooves in said back ply being separated by portions of said back ply which are unreduced in thickness and which present flat surfaces in a common plane having a total area at least about one-half that of said back ply.

7. A plywood panel having outer face and back plies of substantially identical thickness and at least one inner ply, said plies being secured in face to face contact by adhesive with the grain of the face ply parallel with the grain of the back ply and with the grain of at least one inner ply extending transversely of the grain of said face and back plies, said face ply having a plurality of grooves parallel with each other and with the grain of said face ply formed therein by removal of a predetermined volume of wood, said grooves being of equal depth and of uniform depth throughout the lengths thereof, and said grooves having widths varying at random from about one-sixteenth inch to about three-sixteenths inch and being spaced at random within the same range, and said back ply having a plurality of grooves parallel with the grooves in said face ply and spaced from each other at substantially uniform intervals lying within a range of from about one-half inch to about four inches, said last named grooves being of equal depth and of uniform depth throughout the lengths thereof and being formed in said back ply by removal of a volume of wood substantially identical with said predetermined volume removed from said face ply, said grooves in said back ply being separated by portions of said back ply which are unreduced in thickness and which present flat surfaces in a common plane having a total area at least about one-half that of said back ply.

References Cited in the file of this patent

UNITED STATES PATENTS

| Number | Name | Date |
|---|---|---|
| 1,866,527 | Dinkins | July 12, 1932 |
| 2,257,048 | Fulbright | Sept. 23, 1941 |
| 2,286,068 | Deskey | June 9, 1942 |
| 2,354,725 | Weyerhaeuser | Aug. 1, 1944 |
| 2,363,927 | Bailey | Nov. 28, 1944 |